United States Patent
Rabinovich et al.

(10) Patent No.: US 12,499,878 B2
(45) Date of Patent: Dec. 16, 2025

(54) RELIABLE AND INTERPRETABLE DRIFT DETECTION IN STREAMS OF SHORT TEXTS

(71) Applicant: International Business Machines Corporation, Armonk, NY (US)

(72) Inventors: Ella Rabinovich, Hod Hasharon (IL); Matan Vetzler, Givat Shmuel (IL); Samuel Solomon Ackerman, Haifa (IL); Ateret Anaby - Tavor, Givat Ada (IL); Eitan Daniel Farchi, Pardes Hanna-Karkur (IL); Orna Raz, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 341 days.

(21) Appl. No.: 18/295,973

(22) Filed: Apr. 5, 2023

(65) Prior Publication Data
US 2024/0339112 A1    Oct. 10, 2024

(51) Int. Cl.
| | | |
|---|---|---|
| *G06N 5/022* | (2023.01) | |
| *G10L 15/06* | (2013.01) | |
| *G10L 15/18* | (2013.01) | |

(52) U.S. Cl.
CPC .......... *G10L 15/1815* (2013.01); *G06N 5/022* (2013.01); *G10L 15/063* (2013.01);
(Continued)

(58) Field of Classification Search
None
See application file for complete search history.

(56) References Cited

U.S. PATENT DOCUMENTS

| | | | |
|---|---|---|---|
| 7,039,697 B2 * | 5/2006 | Bayles | H04L 61/00 709/223 |
| 9,697,238 B2 | 7/2017 | Ahmed et al. | |

(Continued)

OTHER PUBLICATIONS

H. Zeng, Z. Hong, J. Liu and B. Wei, "Multi-task Learning for Multi-turn Dialogue Generation with Topic Drift Modeling," 2021 IEEE International Conference on Big Knowledge (ICBK), Auckland, New Zealand, 2021, pp. 410-417, doi: 10.1109/ICKG52313.2021. 00061. (Year: 2021).*

(Continued)

*Primary Examiner* — Paras D Shah
*Assistant Examiner* — Mulugeta Tuji Dugda
(74) *Attorney, Agent, or Firm* — Amin, Turocy & Watson, LLP

(57) ABSTRACT

Various systems and methods are presented regarding detecting data drift. The data of interest can be batches of utterances received at an interface (e.g., a chatbot). The batches of utterances can be compared with topics present in training data utilized to train a data classifier (e.g., an autoencoder), wherein topics identified in the batches of utterances that are not present in the training data can be considered to be novel topics. The greater the presence of novel topics in a batch of utterances, the greater the divergence of the batch of utterances from the content of the training data. The novel topics can be identified and subsequently applied to the training data such that the data classifier can be re-trained with the novel topics, thereby causing the data classifier to be contemporaneous with the novel topics. In an embodiment, the utterances can be short streams of text, symbols, and suchlike.

20 Claims, 8 Drawing Sheets

(52) U.S. Cl.
CPC ............... *G10L 2015/0631* (2013.01); *G10L 2015/0638* (2013.01)

(56) References Cited

U.S. PATENT DOCUMENTS

| | | | | |
|---|---|---|---|---|
| 10,579,894 | B1 | 3/2020 | Hines et al. | |
| 11,574,326 | B2* | 2/2023 | Morningstar | G06Q 30/0203 |
| 2020/0046285 | A1* | 2/2020 | Shimmei | A61B 5/7282 |
| 2023/0028693 | A1* | 1/2023 | Marzinzik | G10L 15/26 |
| 2023/0037894 | A1* | 2/2023 | Arya | G06F 40/40 |
| 2023/0084688 | A1* | 3/2023 | Rodrigo Cavalin | G06F 18/23 |
| | | | | 709/206 |
| 2023/0244968 | A1* | 8/2023 | Gurin | G06N 3/0475 |
| | | | | 706/11 |

OTHER PUBLICATIONS

Rabinovich, et al. "Gaining Insights into Unrecognized User Utterances in Task-Oriented Dialog Systems" arXiv:2204.05158, Oct. 24, 2022, 8 pages.

Demsar, et al. "Detecting concept drift in data streams using model explanation" Expert Systems with Applications, 2017, https://doi.org/10.1016/j.eswa.2017.10.003, 42 pages.

Li, et al. "Learning From Short Text Streams With Topic Drifts" IEEE Transactions on Cybernetics, 2017, 15 pages.

He, et al. "Leveraging change point detection to discover natural experiments in data" EPJ Data Science, 2022, https://doi.org/10.1140/epjds/s13688-022-00361-7, 16 pages.

Yin, et al. "Model-based Clustering of Short Text Streams" KDD 2018, Aug. 19-23, 2018, London, United Kingdom, 9 pages.

Wang, et al. "Real-time Change Point Detection using On-line Topic Models", Proceedings of the 27th International Conference on Computational Linguistics, pp. 2505-2515, 2018, 11 pages.

Anonymous "System and Method for Detecting and Explaining Drift in Streaming Unstructured Data" ip.com, Aug. 2, 2022, 4 pages.

Zhang, et al. "Three-layer Concept Drifting Detection in Text Data Streams" Neurocomputing, May 2017, 19 pages.

Ackerman et al.,"Automatically Detecting Data Drift In Machine Learning Classifiers", IBM Research, Nov. 10, 2021, 9 pages.

Greco et al., "Drift Lens: Real-time Unsupervised Concept Drift Detection by Evaluating Per-label Embedding Distributions", IEEE, 2021.

Masud et al., "Classification and Novel Class Detection in Concept-Drifting Data Streams under Time Constraints", IEEE Computer Society, vol. 23, No. 6, Jun. 2011, 16 pages.

Hayat et al., A DCT Based Approach for Detecting Novelty and Concept Drift in Data Streams, IEEE, 2010, 6 pages.

Faria et al.,"Novelty Detection Algorithm for Data Streams Multi-Class Problems", ACM SAC, Mar. 2013, 6 pages.

Spinosa et al., "OLINDDA: A Cluster-based Approach for Detecting Novelty and Concept Drift in Data Streams", ACM SAC, Mar. 11-15, 2007, 5 pages.

Srinivasa et al., "Big Data Analytics", Lecture Notes in Computer Science, Dec. 2012, 192 pages.

Sethi et al., On the Reliable Detection of Concept Drift From Streaming Unlabeled Data, Elsevier, 2017, 77-99.

Jaworski et al., "Concept Drift Detection Using Autoencoders in Data Streams Processing", International Conference on Artificial Intelligence and Soft Computing, Oct. 7, 2020, pp. 124-133.

Ross et al., "Two Nonparametric Control Charts for Detecting Arbitrary Distribution Changes", Journal of Quality Technology, vol. 44(2), Apr. 2012, pp. 102-116.

Ryu, et al., "An Efficient Method of Building an Ensemble of Classifiers in Streaming Data," Big Data Analytics. BDA 2012. Lecture Notes in Computer Science, vol. 7678. Springer, Berlin, Heidelberg. https://doi.org/10.1007/978-3-642-35542-4_11.

\* cited by examiner

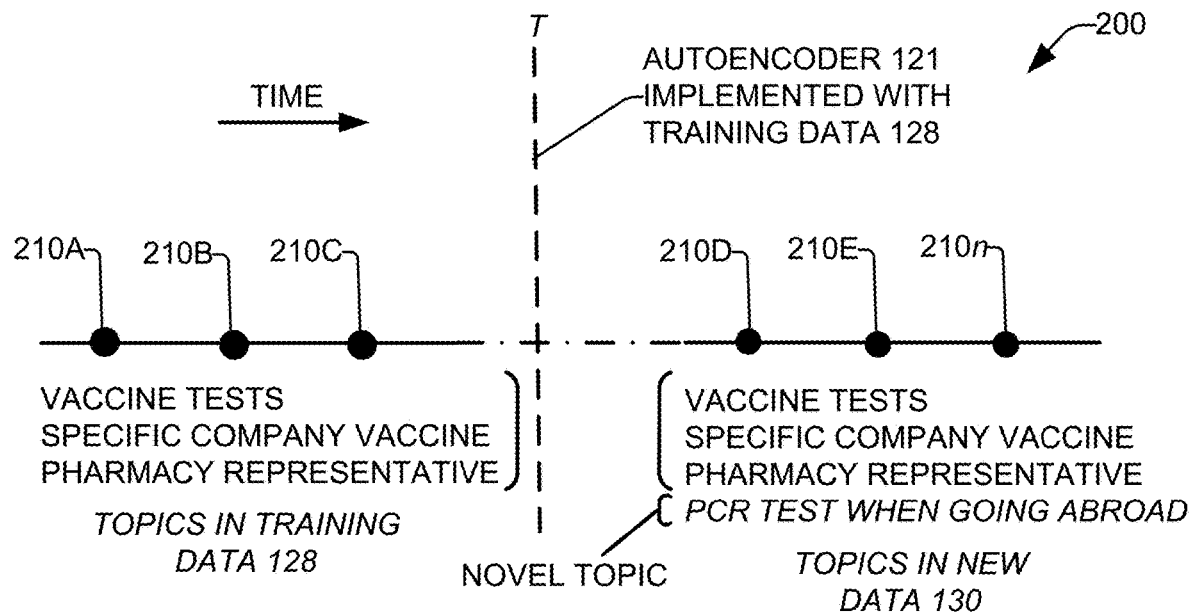
FIG. 2
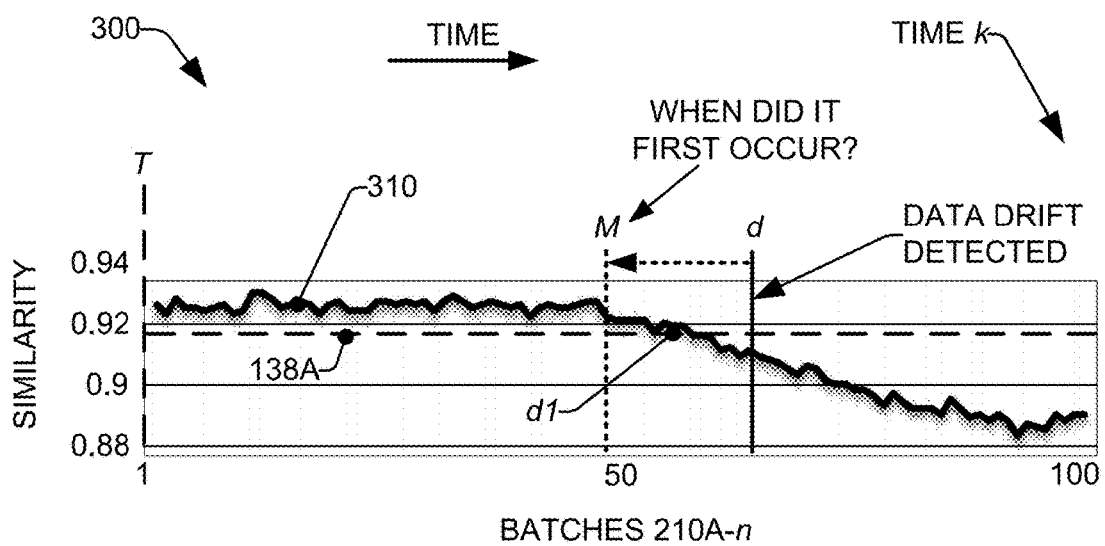
FIG. 3 SIMILARITY (y axis) OF BATCHED TOPICS (x axis) TO THE ANCHOR DATASET/TRAINING DATA

RELIABLE AND INTERPRETABLE DRIFT DETECTION IN STREAMS OF SHORT TEXTS

BACKGROUND

Data drift is a phenomenon where the statistical properties of a class variable, e.g., a target to be predicted, changes. While a model (e.g., an artificial neural network) can be initially trained with training data, it is possible for data content subsequently received at the model (e.g., post-training data) to diverge/drift, either suddenly or gradually, from the type of content forming the training data. Such a situation is commonplace, being a key challenge of maintaining usefulness of complex/large machine-based learning models, particularly as the data drift can result in performance degradation and limited lifetime of application of the model.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate detection of data drift.

According to one or more embodiments, a system is provided that can identify data drift occurring and retrain a classifier system with newly identified topics. The system can comprise a memory that stores computer executable components and a processor that executes the computer executable components stored in the memory. The computer executable components can comprise a drift detection component configured to determine presence of one or more novel topics in a series of batches of utterances, wherein the one or more novel topics are not present in known topics included in training data, and in response to determining a presence of the one or more novel topics occurring for a predefined duration, generate a notification that data drift has occurred.

In another embodiment, the drift detection component can be further configured to assign a similarity value to each utterance in a batch of utterances in the series of batches of utterances, wherein the similarity value can be based upon a degree of similarity between the utterance and topics included in the training data. The classifier component can be further configured to determine an average similarity value for the batch of utterances in the series of batches of utterances based on the respective similarity value assigned to each of the utterances in the respective batch of utterances; and further, determine whether the batch of utterances in the series of batches of utterances comprises one or more novel topics based on the average similarity value relative to an anchor point value, wherein the anchor point value represents the known topics in the training data.

In an embodiment, the computer executable components can further comprise a chatbot configured to receive new data, further format the new data into utterances comprising short strings of text, and segment the new data into the batches of utterances to generate the series of batches of utterances, wherein the utterances have respective topics.

In an embodiment, the utterances in the batches of utterances can comprise short strings of text comprising approximately three words.

In another embodiment, the computer executable components can further comprise a topic analyzer configured to identify a subject matter for respective utterances included in the respective batch of utterances. In a further embodiment, the topic analyzer can be further configured to identify clusters of novel utterances, identify a common topic in the cluster of novel utterances, and add the common topic to the known topics in the training data to create updated training data.

In an embodiment, the computer executable components can further comprise an autoencoder component comprising one or more algorithms, wherein the one or more algorithms are trained based on the known topics in the training data. In a further embodiment, the autoencoder can be further configured to apply the updated training data to a subsequently received batch of utterances to determine presence of a topic in the subsequently received batch of utterances to determine data drift occurring in data received after training the autoencoder with the updated training data.

In a further embodiment, the drift detection component can be further configured to, in response to determining a presence of the one or more novel topics no longer occurring for a predefined duration, generate a notification that data drift is not occurring.

In an embodiment, each utterance in a batch of utterances is represented by a multidimensional vector.

In other embodiments, elements described in connection with the disclosed systems can be embodied in different forms such as computer-implemented methods, computer program products, or other forms. For example, in an embodiment, a computer-implemented method can be utilized for detecting data drift and novel topics giving rise to the data drift to subsequently retrain a classifier system. In an embodiment, the computer-implemented method can comprise determining, by a device comprising a processor communicatively coupled to an automated interface, data drift has occurred between batches of utterances and a batch of training data, wherein the batches of utterances include at least one novel topic that is not present in the training data. The method can further comprise assigning a similarity value to each utterance in a batch of utterances, wherein the similarity value is based on determining a degree of similarity between the respective utterances in the batch of utterances and topics included in the training data. In another embodiment, the method can further comprise determining a mean similarity for the batch of utterances, wherein the mean similarity is the calculated mean value of the respective similarity values determined for each utterance in the batch of utterances. The method can further comprise comparing the mean similarity for the batch of utterances with a threshold value, wherein in the event of the mean similarity being below the threshold value, indicating that the batch of utterances has content similar to the training data, and in the event of the mean similarity being above a threshold value, indicating that the batch of utterances has content deviating from the content of the training data. In another embodiment, the method can further comprise keeping a tally of the batches of utterances having content that deviates from the training data content and in the event of the tally exceeds a threshold number of batches, generating a notification that data drift has occurred. The method can further comprise identifying clusters of utterances, determining a common subject matter topic for a cluster in the cluster of utterances, and updating the training data to include the common subject matter topic.

Further embodiments can include a computer program product comprising a computer readable storage medium having program instructions embodied therewith, the program instructions executable by a processor can cause the processor to determine, by a device comprising a processor, data drift occurring between batches of utterances and training data, wherein the batches of utterances include at least one novel topic that is not present in the training data.

DESCRIPTION OF THE DRAWINGS

One or more embodiments are described below in the Detailed Description section with reference to the following drawings:

FIG. 2 presented a schematic illustrating a new topic being incorporated into newly received data, in accordance with an embodiment.

FIG. 3, presents a plot of data illustrating data drift occurring and being detected, according to an embodiment.

DETAILED DESCRIPTION

Figure 1:
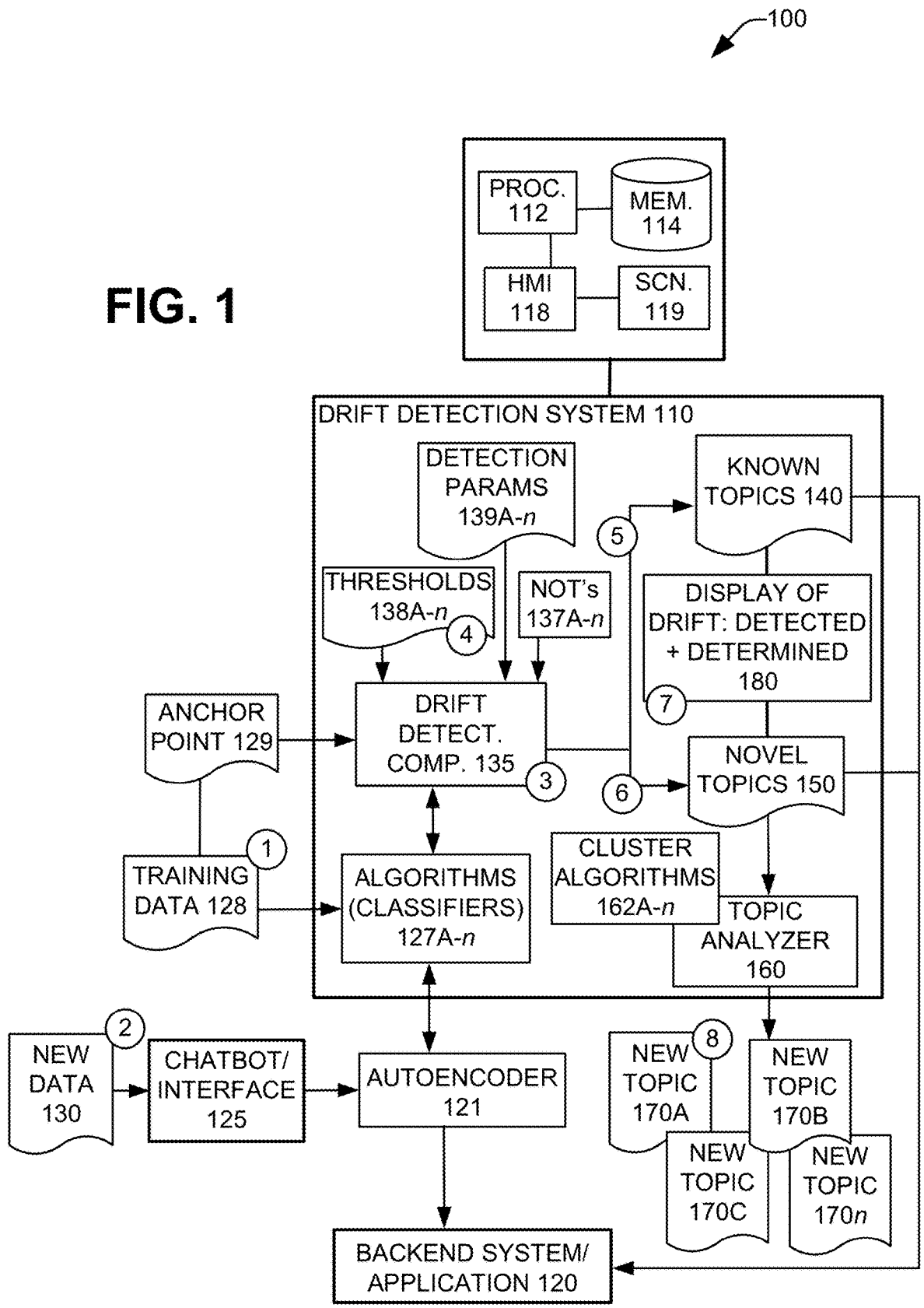
FIG. 1 illustrates a system that can be utilized to detect data drift, in accordance with an embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, "data" can comprise metadata. Further, ranges A-n are utilized herein to indicate a respective plurality of devices, components, signals etc., where n is any positive integer.

It is to be appreciated that while the various embodiments and examples presented herein are directed towards an intent of a user interacting with an automated system (e.g., via a chatbot), the various embodiments are not so limited and can be applied to any domain, information, data, topics, utterances, intents, intents, types, etc., which can be expressed with a symbolic representation, whether it be alphanumeric representation of text and/or numbers, a sequence of symbols, a speech to text (STT) representation, one or more chains of elements in a molecule (e.g., where the molecule is included in virus that undergoes continual evolution), and suchlike. Further, while the various examples presented herein generally pertain to textual representation, the various embodiments can equally be applied to speech, utterances, snippets of speech, speech recordings, audio input, video input, and the like.

As previously mentioned, a classifier system, such as an artificial neural network (ANN) (e.g., an autoencoder), can be trained with initial data comprising various topics (e.g., utterances comprising user intents) that were encountered up to the time the training of the ANN was conducted. Data input can be captured by an interface (e.g., a chatbot) to a backend/underlying system configured to capture/process/respond to the data. The training data can be considered to be accurate and reliable at the time of training. However, once the system is deployed with the training data, novel topics may be subsequently received via the chatbot. The novel topics can differ from the original topics with which the ANN was initially trained, giving rise to data drift. The degree of difference between a novel topic in the newly received data can differ by any degree from one or more topics in the training data, e.g., the degree of difference can range from slight to significant. Once data drift occurs, the usefulness of the ANN is hindered, potentially affecting the useful lifetime of the ANN, to the point that the ANN may become outdated/obsolete. Accordingly, it is useful to identify the data drift arising from novel topics as soon as possible, such that the ANN can be retrained with training data updated to include the novel topics. With timely detection of an occurrence of data drift, and further, identification of the novel topics, the ANN can be maintained such that the ANN is configured based on a most recent series of topics available (e.g., intents uttered by customers of the backend system). Further, by identifying the novel topic(s) giving rise to the data drift, retraining of the ANN enables the ANN to be further responsive to a topic (e.g., a previously unaddressed intent) that while the topic remained unidentified engenders frustration for those users looking for assistance from the chatbot regarding information pertaining to the novel topic.

Currently, available data drift systems are implemented with long streams of data, e.g., a long sentence, a paragraph, multiple paragraphs, across multiple pages, and suchlike. However, the various embodiments presented herein can also be directed towards identifying data drift as a function of data comprising short streams of data, e.g., a topic comprising two to three words comprising an utterance that conveys a user's intent/interest.

Regarding the chatbot interface, novel topics can arise from users asking questions in alternative ways, asking questions as a function of new information/techniques arising that pertain to a domain (subject matter) of the chatbot and underlying backend system/application (e.g., questions regarding the COVID virus are initially directed towards identifiable symptoms and what to if detected, but later, once the PCR (polymerase chain reaction) test became available, encompass how to obtain a PCR test), and suchlike.

Drift detection can be a highly complicated endeavor that is beyond the capabilities of human-based analysis, e.g., a typical scenario comprises identification of a novel topic arising in a chatbot-ANN application developed based on training data comprising hundreds of identified topics. A further issue arises regarding a duration of presence of a novel topic, for example, does the novel topic pertain to an isolated, short-term incident (e.g., a holiday season subject matter), or is the presence of one or more novel topics an indication of a long-term systematic, consistent change. Accordingly, given the requirement of identifying data drift as soon as possible, a conflict can arise whereby a system requires sufficient time to achieve an acceptable level of confidence in identifying the occurrence of data drift versus the requirement to identify the data drift in as short a time as possible from when the data drift actually occurred (e.g., the presence of the novel topic(s) became statistically significant). As described further herein, once data drift is deemed to be occurring, the various data topics in newly received data can be reviewed to identify the novel topics, when did the novel topics being to appear, etc., with information regarding the newly found topics presented to a data analyst, a data programmer, etc., to review/update the ANN accordingly to capture/accommodate a future effect(s) of the novel topics.

Turning now to the drawings, FIG. 1 illustrates a system 100 that can be utilized to detect data drift, in accordance with one or more embodiments. As shown, system 100 can include a drift detection system (DDS) 110 comprising various devices and components to identify data drift in temporal data, and to further determine one or more new topics occurring in the data that may be the cause of the data drift. DDS 110 can be communicatively coupled to a backend system/application 120, wherein the backend application 120 can be any applicable system such as an automated health care system (e.g., configured to provide information, appointments, etc.), an automated banking system, an automated customer support system, and suchlike.

As shown, a chatbot 125 (or other suitable automated interface) can be used to enable input into the backend application 120, e.g., where the input comprises utterances by users interacting with the backend system 120. In a conventional system, with the combined functionality of the backend system 120 with a chatbot 125, inputs received at the chatbot 125 (e.g., utterances, speech, etc.) can be identified/classified by an autoencoder 121 (e.g., ANN) operating in conjunction with algorithms 127A-n, wherein the algorithms 127A-n can be configured to classify inputs, parts of inputs, topics (e.g., subject matter of user intent, topic of interaction, and suchlike, in customers utterances) that have been previously identified and applied to the algorithms 127A-n. e.g., in training data 128. However, the relevance/applicability of an algorithm 127A-n is only as current as the time at which the training data 128 was compiled/generated. Hence, when new data 130 is received at the chatbot 125, it is possible that the new data 130 includes topics, intents, subject matter, etc., that was not present when the training data 128 was generated, and as the time window between the creation of the training data 128 and the new data 130 increases, the possibility of topic dissimilarity between the training data 128 and the new data 130 continues to increase. The respective utterances in the training data 128 can be mathematically processed such that the totality of the topics in the training data 128 can be expressed as a value, anchor point 129 (e.g., a mean value of all of the utterances in the training data 128), wherein a mathematical representation of subsequent batches of utterances comprising known topics and novel topics can be compared with the anchor point value 129, as further described. In an embodiment, the training data 128 can be referred to as anchor point data, as an anchor point 129 can be derived from the training data 128, wherein data drift is determined based upon a value shift of a mean value representation of a batch of utterances from the value of anchor point 129.

As new data 130 is received at the chatbot 125, and the various topics are batched (e.g., by time, number of topics, and suchlike, at the chatbot 125) and fed into the autoencoder 121/algorithms 127A-n. Review of the batches 210A-n can be supplemented by a drift detection component (DDC) 135 configured to detect a drift in data content resulting from one or more topics in the new data 130 not being contemporaneous with topics present in the training data 128. As each new batch of topics in new data 130 is received, the batch can be analyzed (e.g., by DDC 135) to determine the similarity/dissimilarity of the topics in the respective batches of new data 130 to the topics in the training data 128. The respective topics in the new data 130 can be separated out into (a) known topics 140 comprising topics that have been previously identified and included in the training data 128, and (b) novel topics 150 comprising topics that have not been previously identified or included in training data 128. The novel topics 150 can be further processed/analyzed, e.g., to enable determination of why data drift occurred, identification of novel topics to update the training data 128, and suchlike. As novel topics are identified in the collection of novel topic data 150, the identified topics can be extracted as new topics 170A-n. As further described, the novel topics 150 can be presented on a vector plot, whereby each multi-vector representation of each data topic can be reduced to a 2-dimensional representation, per FIGS. 7A and 7B, from which clusters of similar topics/utterances can be identified for further review.

Turning momentarily to FIGS. 2 and 3, schematic 200 and plot 300 are presented to provide understanding of the various embodiments presented herein. As shown in FIG. 2, over the course of time, various topics are identified and combined to form the training data 128, wherein, in the example scenario, the topics represent identified intents of customer's utterances and interactions with the chatbot 125 regarding vaccine tests available, a specific vaccine available by a manufacturer, and a requirement to speak with a pharmacy representative. In an embodiment, the various customer utterances with the chatbot 125, can be temporal and collected in a series/sequence of batches 210A-n, wherein the topics in the batches of utterances 210A-C are included in the training data 128. At time T, the autoencoder 121 and the algorithms 127A-n are trained with the training data 128, with the autoencoder 121 subsequently going "live", whereupon new data 130 is received at the chatbot 125, e.g., in the form of utterances and intents, and applied to the autoencoder 121. As with the training data 128, the customer utterances are captured as batches over time, wherein the batches 210D, 210E . . . 210n comprise the respective batches of customer utterances received at the chatbot 125 after time T. As shown, subsequent to time T, as well as mentioning the previously captured topics, customers are also raising the novel topic "PCR test when going abroad" as they require information about vaccine requirements to travel abroad. The frequency with which the novel topic is uttered in the new data 130 can become significant to the point that the novel topic forms a significant portion of the utterances received at the chatbot 125 such that data drift occurs with a corresponding divergence away from the anchor point value 129 of the training data 128. As mentioned, the number of utterances in a batch 210A-n that are not recognized by the autoencoder 121 can cause a dissimilarity to occur, e.g., the similarity is no longer zero. However, the number of topics and/or the total number of different topics in a batch 210A-n may be sufficiently small that the degree of divergence from the training data 128 is only marginally affected. However, as the total number of unrecognized topics (e.g., both as a function of a high occurrence of a single topic, and/or a presence of many topics with sufficient occurrences) increases e.g.:

Total number $X$ of individual utterances in a batch$_k$=total number $Y$ of recognized utterances in a batch$_k$+total number $Z$ of unrecognized utterances in a batch$_k$, where $k$=a point in time.

In an embodiment, the effect of Z upon the similarity of a new batch of utterances versus the utterances in the training data can be a function of many utterances of a few novel topics, there are many novel topics but with fewer utterances, and suchlike.

Turning to FIG. 3, chart 300 presents an example of data drift occurring and being detected, according to an embodiment. Chart 300 comprises plot/line 310 representing the similarity (y axis) of the topics in respective batches in new data 130 (x axis) versus the mean value (anchor point 129) of topics in the training data 128. As previously mentioned, at time T, respective batches 210A-n of utterances are captured, whereby, in the example presented in FIG. 3, one hundred batches 210A-n have been generated. Initially, the similarity between the topics in the training data 128 and the new data 130 is high, with a similarity index of 0.93. However, at approximately the $50^{th}$ batch, the similarity begins to reduce, e.g., from the initial index of 0.93 down to a similarity index of approximately 0.89. The DDC 135 can maintain a tally of the batches having the reduced similarity index, wherein, when a sequence of batches below a threshold value (e.g., threshold 138A-n) have been tallied, the DDC 135 can make a determination that data drift is occurring. Given the operational requirement to identify a consistent and systematic data drift in topic type/frequency, there is a delay between when the data drift divergence began and when it is identified (e.g., by DDC 135), hence, in the example scenario, the data drift is not identified until time d, approximately the $65^{th}$ batch. In an embodiment, the threshold 138A may be set to a particular similarity index, e.g., per FIG. 3, threshold 138A is set to 0.918, which is crossed by line 310 at ~$55^{th}$ batch. However, a detection parameter 139A is set to "minimum below threshold duration"=6 batches, hence, the drift d is identified at ~$62^{nd}$ batch.

With the occurrence of data drift having been established at time d, the new data 130 can be reviewed to identify (e.g., by DDC 135, topic analyzer 160) when the one or more new topics 170A-n began to be received at the chatbot 125, and further, what the particular new topics 170A-n may be. Accordingly, it is established that the one or more new topics 170A-n began to appear at time M, approximately the $50^{th}$ batch of utterances. One or more parameters 139A-n can be applied to the DDC 135 (e.g., via HMI 118) to enable the DDC 135 to determine, with an acceptable level of confidence, that data drift has occurred. For example, parameters 139A-n can include a 'duration parameter' that is to be met wherein the dissimilarity between the training data 128 and the new data 130 continues for at least the duration, parameters 139A-n can also include a 'number of batches' parameter defining how many batches have to be accrued (e.g., consecutively) having the dissimilarity between the training data 128 and the new data 130, and suchlike. In an embodiment, the point M at which the data drift is determined to have been initiated can be established by any applicable method, e.g., (a) change in slope of plot of new data 310, (b) identifying presence of one or more topics that contribute (e.g., the most significant contribution) to the data drift, and suchlike.

It is to be appreciated, that while FIGS. 2 and 3 illustrate three original topics and a 4th novel topic being introduced, the presented scenario is a highly simplified representation of a real life/real world scenario where the number of original topics can number in the hundreds, thousands, etc., and similarly the number of novel topics can run into the tens, hundreds, etc., as a function of the complexity of the information/application for which the backend system 120, chatbot 125, and autoencoder 121 are designed to receive and/or process. Accordingly, given such complexity, the implementation of AI techniques (e.g., autoencoder 121, algorithms 127A-n, training data 128, etc.) enables detection of data drift in a manner that would be difficult and untimely in a human-based system of analysis and detection.

A degree of divergence of the new data 130 from the training data 128 can be established, wherein the degree of divergence can range from zero to one (0→1). A divergence of 0 indicates that the range of topics in the utterances of new data 130 is the same, or very similar, to the range of topics in the utterances in the training data 128. As topic divergence increases between the new data 130 and the training data 128, the degree of divergence increases to 1, wherein a value of 1 indicates highly significant departure of the topics in the new data 130 from the topics in the training data 128. In an embodiment, a threshold value 138A-n can be defined, such that when the degree of divergence is below the threshold 138A-n, the new data 130 and the training data 128 can be determined to be sufficiently the same, and if data drift is occurring, it is at an acceptable level (e.g., small number of novel topics and/or small volume of utterances of the novel topics). Alternatively, when the degree of divergence matches or exceeds the threshold value 138A-n, then data drift can be considered to be occurring (e.g., there are a significant number of topic subjects being presented at the chatbot 125 and/or a significant volume of utterances of new topics 170A-n).

DDS 110 can further include a topic analyzer 160 configured to identify respective new topics 170A-n in the collection of novel topics 150. Any suitable technique can be utilized to identify respective topics comprising new topics 170A-n. For example, in an embodiment, the topic analyzer 160 can operate in conjunction with one or more clustering algorithms 162A-n. Each of the utterances in the novel topics 150 can have a multidimensional vector representation (e.g., assigned by the autoencoder 121), wherein the topic analyzer 160 can be configured to cluster coherent/similar utterances (e.g., based on similar vector representations) to identify respective topics included in the new topics 170A-n.

The following presents an overview of a technique to determine (e.g., at the DDC 135) an occurrence of data drift. It is to be appreciated that the following approach is but one of many techniques for determining data drift, wherein the various embodiments presented herein can equally apply to any other mathematical approach to determine data drift.
(i) $M_a$=an autoencoder model 121 having an anchor point 129 obtained by training with training data 128. The anchor point 129 can be based upon the respective values of topics present in the training data.
(ii) time window=(1, 2, 3 . . . , k),
wherein 1 is a first instance of new data 130 being applied to the autoencoder, through to k being the most recent, wherein the values 1, 2, 3 . . . k, can function as timestamps to chronologically sequence each of the batches 210A-n of topics in the new data 130.

(iii)
$$\text{utterances at each time point } k = (u_1^k, u_2^k, u_3^k, \ldots, u_n^k). \qquad \text{Eqn. 1}$$

wherein the respective utterances are collected to form the respective batch 210A-n of utterances/topics at each time window 1, 2, 3, . . . k.

(iv)
$$M_a(u_i^k) = \text{reproduced utterance } i \text{ at time point } k(\text{e.g., by the } M_a). \qquad \text{Eqn. 2}$$

wherein each utterance in a batch 210A-n can be compared to determine presence/similarity of the utterance to the utterances in the training data 128. As mentioned, utterances in the new data 130 that are the same/similar to utterances in the training data 128 can be assigned a value of 0 or close to 0, while utterances in the new data 130 that are significantly different to utterances in the training data 128 can be assigned a value of 1. For each batch of utterances 210A-n, the autoencoder 121 classifies/processes (e.g., compresses/recompresses) each of the utterances included in the respective batch. The values of 0 through to 1 can be considered a measure of how easy the autoencoder 121 was able to classify an utterance, e.g., if an utterance in the new data 130 is the same/similar to an utterance in the training data 128, the autoencoder 121 will be able to classify the utterance (easy to vectorize, assigned similarity value=~0 (high similarity)), while the autoencoder 121 can have difficulty in classifying a novel utterance (difficult to vectorize, assigned similarity value=~1 (high dissimilarity)). The respective vector representations of similarity of the respective utterances in a batch can be averaged, e.g., by the autoencoder 121 or the DDC 135.

(v)
$$u_i^k \text{ reconstruction similarity } (sim) = \cos\_sim(u_i^k, M_a(u_i^k)). \qquad \text{Eqn. 3}$$

By utilizing a cosine function, the relative similarity values in the range of 1→0, become 0.54→1.0, hence, per FIGS. 3 and 4A-4C, a value of 1 on the similarity axis y indicates 100% similarity between training data 128 and new data 130, and a reduction in similarity causes the line 310 to drop in value.

(vi)
$$sim^k = \text{mean}(\cos\_sim(u_i^k, M_a(u_i^k))) \text{ for } i \in (1 \ldots n). \qquad \text{Eqn. 4}$$

wherein $sim^k$ is the mean cosine similarity for the respective utterances in a batch k (e.g., any of batches 210D-n) vs the anchor point value 129, over time.
(vii) Data drift can be detected (e.g., by DDC 135) based on identifying a time index 1<d<k such that the mean $sim^k$ changes significantly at time d from the mean $sim^k$ present prior to time d.

As previously mentioned, d can be determined (e.g., by DDC 135) by any suitable technique/technology, such as by application of a change point model (CPM) technique. In an example approach, a CPM technique can be configured to detect a change in the average $sim^k$ by applying two-sample Student's T-test repeatedly to all possible past split points d, at each time index k. Essentially, a Student's T-test is a method of testing hypotheses about the mean of a small sample drawn from a normally distributed population when the population standard deviation is unknown. The CPM technique should be configured to minimize/control issues of false-positive drift detection, wherein a false-positive drift detection would be an indication that data drift has occurred, when in actuality, data drift has not occurred, or not to a degree having a desired level of statistical confidence, hence a false-positive is a premature drift detection. In an example application, the CPM can be configured to control false-positives at a level α. Hence, in an example scenario, the CPM can be configured such that α=0.05, whereby for each time k for which drift has yet to be determined/detected, if drift has been detected, the probability that the determined drift is a false-positive/premature (e.g., data drift has not happened) is at most α. Naïve application of statistical tests to detect data drift without proper sequential control can lead to a false-positive rate that is higher than desired a.

As shown in FIG. 1, the DDS 110 can include a processor 112 and a memory 114, wherein the processor 112 can execute the various computer-executable components, functions, operations, etc., presented herein. The memory 114 can be utilized to store the various computer-executable components, functions, code, etc., as well as any of the training data 128, new data 130, algorithms 127A-n, anchor point value(s) 129, threshold(s) 138, novel topics 150, known topics 140, topics 170A-n, batches 210A-n, and suchlike.

In an embodiment, the DDS 110 can further include a human-machine interface (HMI) 118 (e.g., a display, a graphical-user interface (GUI)) which can be configured to present various information including training data 128, new data 130, algorithms 127A-n, anchor point value(s) 129, threshold(s) 138, novel topics 150, known topics 140, topics 170A-n, batches 210A-n, and suchlike, per the various embodiments presented herein. The HMI 118 can include an interactive display/screen 119 to present the various information via various screens presented thereon, and further configured to facilitate input of information/settings/etc., regarding the various embodiments presented herein regarding operation of the drift detection system 110 and the new data 130. For example, screen 119 can present a plot (e.g., similar to chart 300) of the determined similarities $sim^k$, the time d at which data drift was detected, the time M when the data drift was determined to occur, the new topics 170A-n, and suchlike. HMI 118 can be further utilized to receive thresholds 138A-n, detection parameters 139A-n, and suchlike.

As shown on FIG. 1, an example/representative sequence of events can be followed:

1) algorithms 127A-n associated with an autoencoder 121 (e.g., a ANN) are trained with training data 128 that includes known topics captured during prior interactions with a chatbot 125, wherein the chatbot 125 can form a front-end interface of a backend system/application 120. The training data 128 can enable an anchor point value 129 to be established, wherein the anchor point value 129 can be a numerical representation of the collection of topics included in the training data 128, e.g., the mean value of the classified topics in the training data 128.

2) new data 130 can be received at the chatbot 125, wherein the new data 130 can be processed by the autoencoder 121. In an embodiment, the autoencoder 121 can identify/classify/process those topics in the new data 130 for which the algorithms 127A-n have been previously trained, e.g., with the training data 128.

3) as the respective batches of topics are processed, each batch can be processed and a content value generated, wherein the content value of each batch can be compared, by the DDC 135, with the anchor point value 129.

4) a threshold 138 can be applied to the DDC 135 (e.g., via HMI 118), such that if the mean dissimilarity between the topics in the training data 128 (as expressed by the anchor point value 129) and the classifier value is below the threshold, no deviation in data is occurring. However, in the event of the mean dissimilarity being above the threshold, then divergence can be considered to be occurring, and a notification 137A-n can be generated indicating data divergence detected. Further, one or more parameters 139A-n can be utilized by the DDC 135 to ensure that the data drift determination is made with an acceptable level of confidence (e.g., based on duration, number of batches, and suchlike).

5) the respective topics in the new data 130 can be extracted (e.g., by topic analyzer 160), such that known topics 140 (e.g., those pre-existing in the training data 128) can be extracted and stored.

6) the one or more novel topics 150 in the new data 130 can be extracted (e.g., by topic analyzer 160) and stored, wherein the novel topics 150 are outlier topics that the autoencoder 121 has not been trained to recognize.

7) to enable review by a data analyst, the values (e.g., $sim^k$ for each batch 210A-n) can be presented (e.g., on HMI 118/screen 119 as shown at 180) indicating the drift detection point d, drift initiation M, vector representations, and suchlike.

8) the novel topics 150 can be analyzed and clustered, e.g., by the topic analyzer 160 in conjunction with a clustering algorithm 162A-n, with respective individual and/or clusters of related topics 170A-n extracted therefrom for further data analysis (e.g., by a data analyst) with the potential that the training data 128 is updated to include the newly identified new topics 170A-n, and the autoencoder 121/algorithms 127A-n further trained with the newly updated training data 128.

Figure 4A:
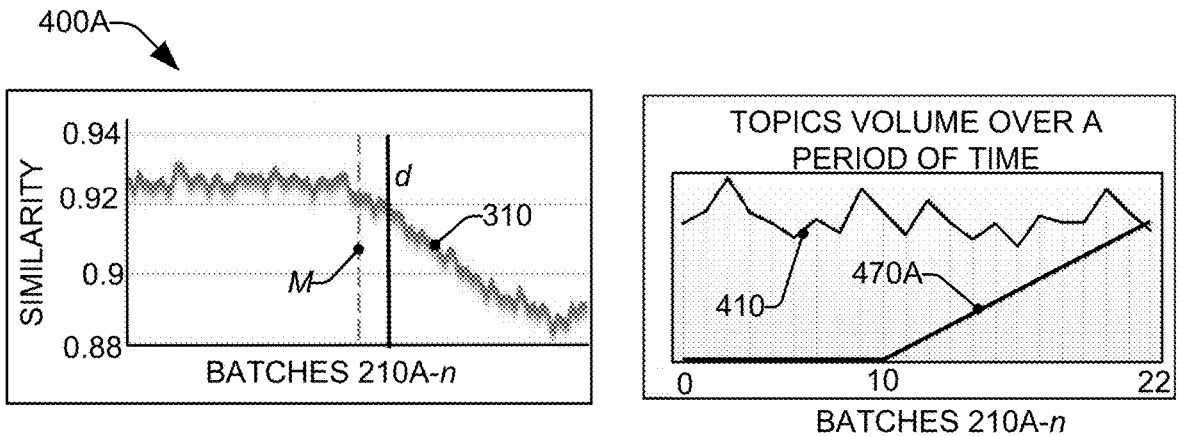
FIGS. 4A-C, present charts illustrating different types of potential data drift, in accordance with an embodiment.
Figure 4B:
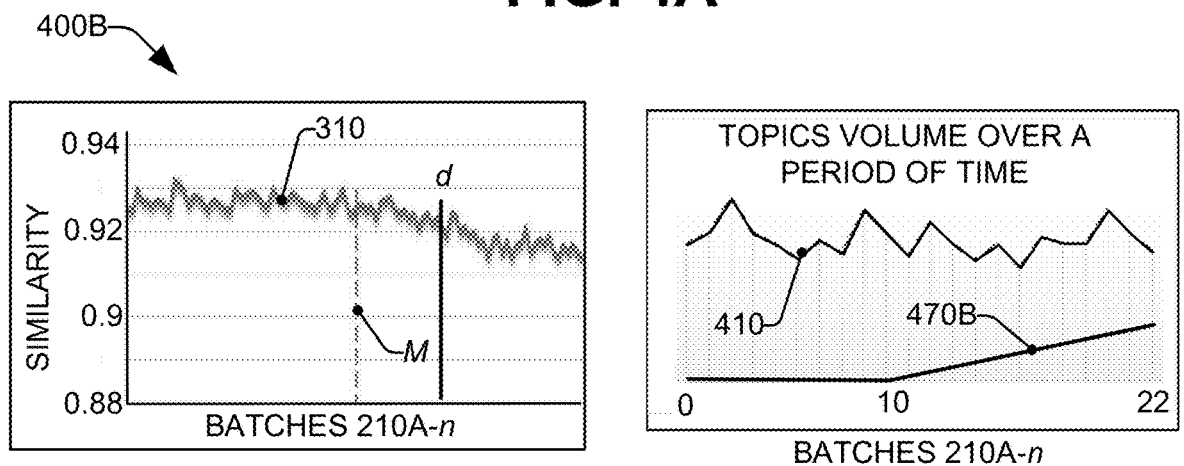
Figure 4C:
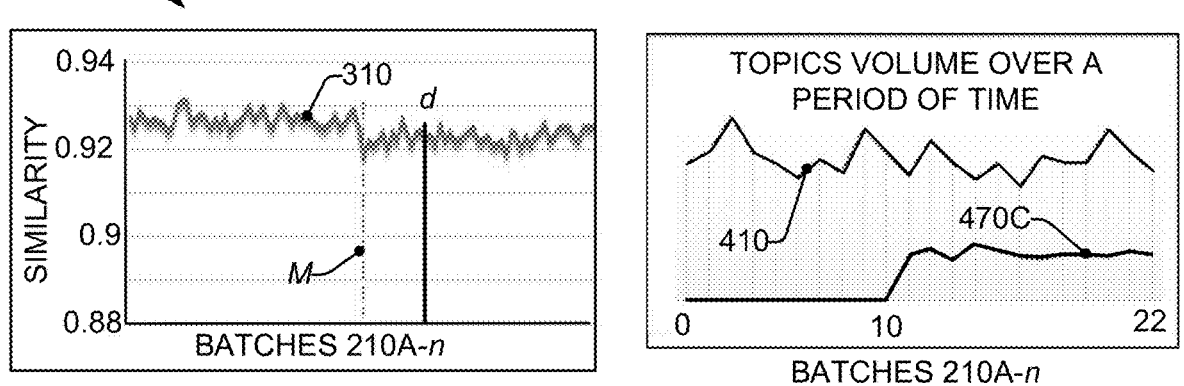

FIGS. 4A-C, charts 400A-C further illustrate different types of potential data drift. FIG. 4A illustrates a scenario where the number of unique topics 150 and/or the volume of unique topics 150 changed rapidly, e.g., as shown by the slope of plot 470A of known topics after batch 10. The slope of line 470A illustrates the data drift occurring at a high pace, with a rapid increase in dissimilarities being generated by the autoencoder 121 at similarity departure point M. Given the rapid appearance of novel topics 150, the data drift after batch 10 should be easy and quick to be recognized by DDC 135. FIG. 4B illustrates a scenario where the number of unique topics 150 and/or the volume of unique topics 150 changes, e.g., at batch 10, but at a slower rate (slope is shallower online 470B) than the scenario presented in FIG. 4A. While the decrease in topic similarity is less rapid than that presented in FIG. 4B, the decrease is sustained, hence, DDC 135 may take longer to identify the data drift occurring than the scenario presented in FIG. 4A, as the DDC 135 needs to gain confidence that data drift is occurring, and thus may take longer to detect the drift than that of FIG. 4A. FIG. 4C illustrates a scenario where there was a sudden presence of novel data, e.g., at batch 10 of line 470C, but the volume was not as high as the scenario presented in FIG. 4A. As shown, by the respective lines 470A-C, the novel topics 150 appear and then remain consistent/stable (neither increasing or decreasing over time), indicating a stable amount of novel topics 150 present in the new data 130 from batches 10 through to 22.

Figure 5:
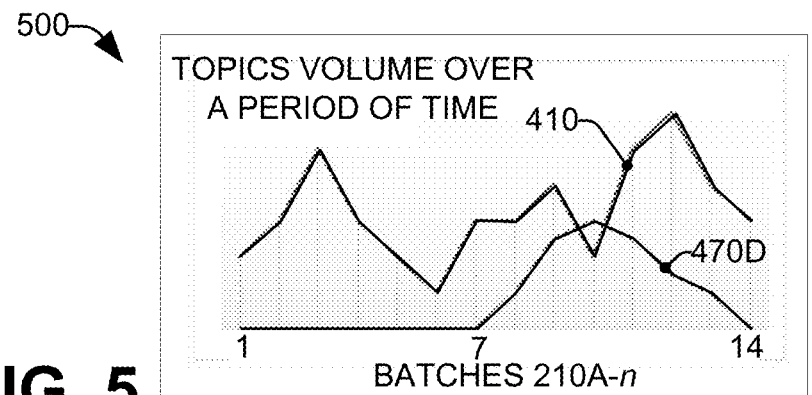
FIG. 5, presents a chart illustrating a scenario where a topic is present for a short period of time, according to an embodiment.

FIG. 5, chart 500 further illustrates a scenario where a topic is present for a short term (e.g., like a topic relating to a holiday season), according to an embodiment. As shown, the amount of new topics in batches of new data 1-6 is low such that the difference in content between the new data and the training data 128 is low. However, at the $7^{th}$ batch, novel topics begin to appear in the batches of data, with a corresponding increase in the height of line 470D. However, at the $10^{th}$ batch of new data 130, the presence of novel topics begins to diminish with a corresponding reduction in the height of line 470D. Accordingly, the short-lived presence of novel topics indicates that data drift (e.g., arising from a constant, systemic presence of new topics 170A-n) did not occur, but rather there was a short-term topic spike. By utilizing a minimum count of batches, the DDC 135 can be configured to identify an effect of data drift (with an acceptable level of probability) rather than a short-term presence of a topic(s). Per the example scenario shown in FIG. 5, given the short duration (e.g., ~7 batches of utterances) the DDC 135 can infer that the data drift is not occurring and can generate a notification 137A-n that data drift is not occurring, and the incident was a short-presence of a topic(s).

Figure 6:
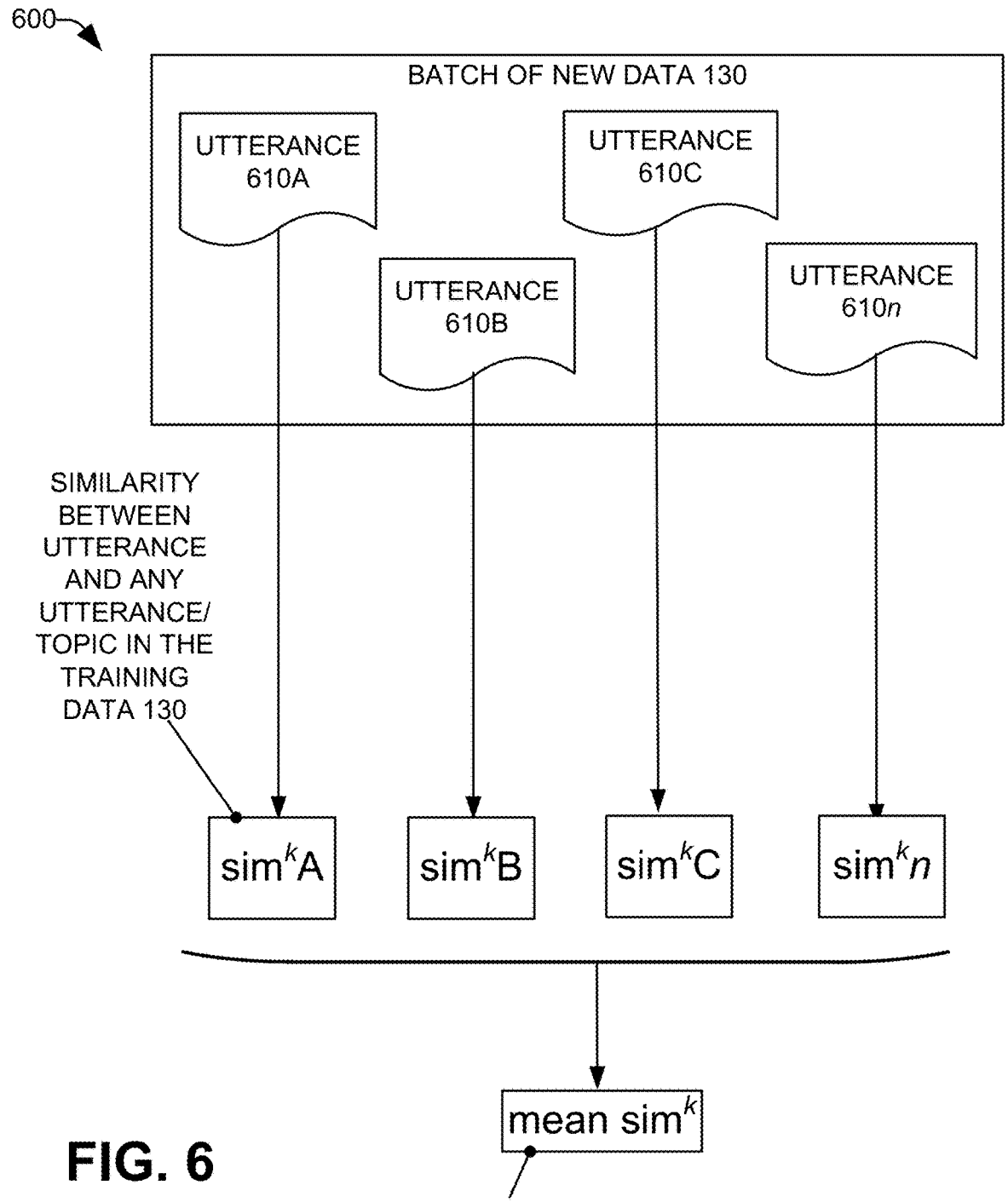
FIG. 6, presents a schematic illustrating utterances being reviewed with a mean similarity value being generated, in accordance with one or more embodiments.

FIG. 6, schematic 600, illustrates utterances being reviewed with a mean similarity value being generated, in accordance with one or more embodiments. A batch 210A-n of new data 130 can be received (e.g., at the chatbot 125/autoencoder 121) wherein the new data includes a group of utterances 610A-n (e.g., each utterance has a topic of subject matter). As previously described, each utterance 610A-n can be compared, e.g., by autoencoder 121, with topics included in training data 128. Each utterance 610A-n can be assigned a similarity value $sim^k$, e.g., utterance 610A has a similarity value sim A, utterance 610B has a similarity value sim B, utterance 610n has a similarity value $sim^k n$, etc. The mean (mean $sim^k$) of the similarity values $sim^k$A-n can be calculated, e.g., by the autoencoder 121. The value mean $sim^k$ can be subsequently compared to the anchor point value 129, e.g., by DDC 135, to determine the degree of similarity the topics in the batch of new data 130 have with the topics in the training data 128, e.g., as assessed by the threshold value 138.

Figure 7A:
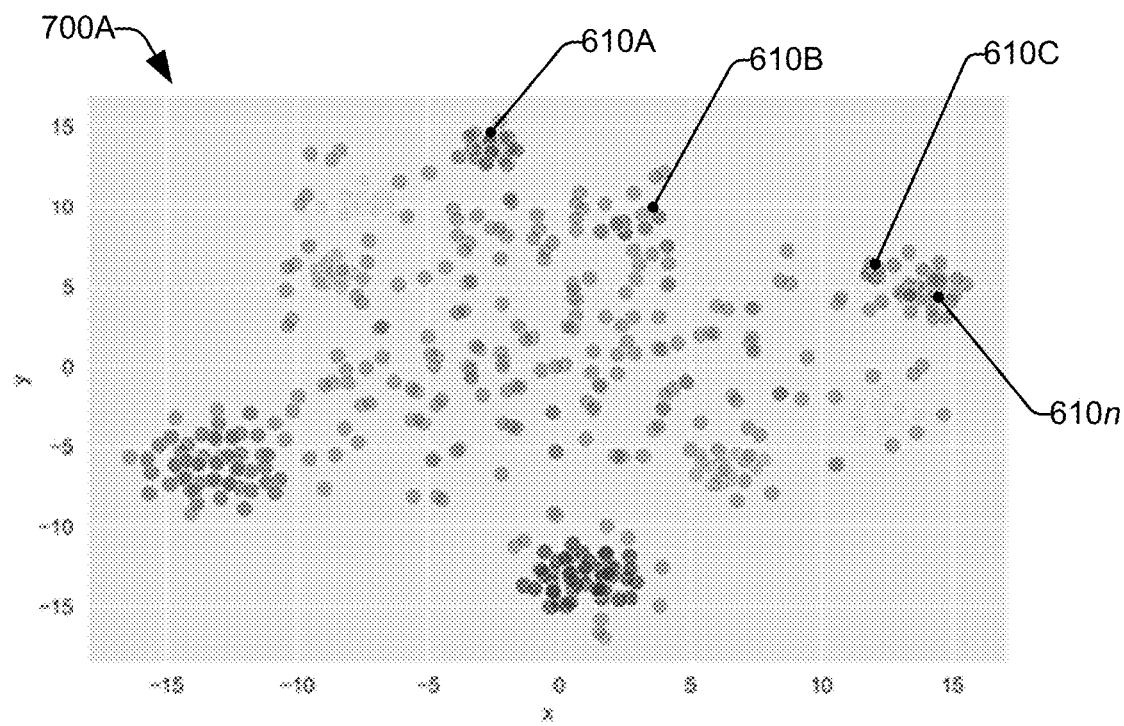
FIGS. 7A-B, present plots utilized to identify novel topics that may be causing data drift between the training data and the novel data, in accordance with an embodiment.
Figure 7B:
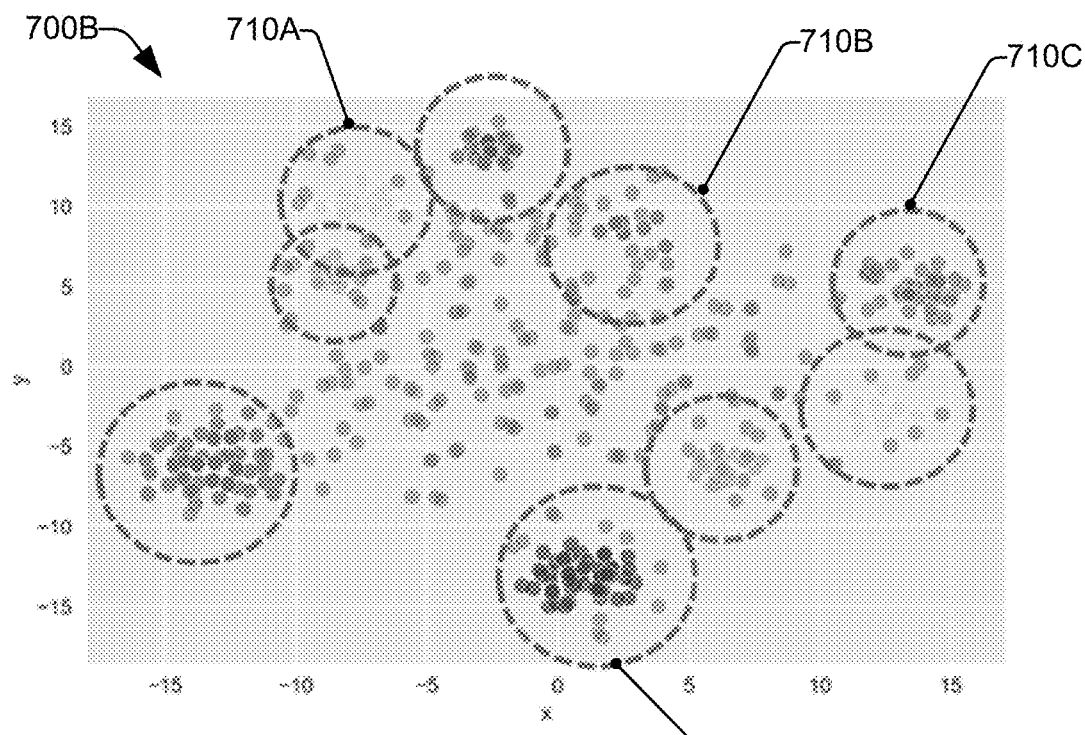

As previously mentioned, the novel topics can be analyzed to identify utterances that may be causing the data drift between the training data and the novel data. As part of processing the respective topics in batches of utterances 210A-n. Each respective utterance can be defined/represented (e.g., by the autoencoder 121) as a multi-dimensional vector (e.g., a vector of many dimensions), wherein utterances having a similar vector representation can be considered to form clusters. Accordingly, those utterances having a common topic will likely have a similar multi-dimensional representation, thereby forming a cluster. Hence, the topic analyzer 160 in conjunction with respective clustering algorithms 127A-n can analyze and cluster utterances such that new topics 170A-n can be generated based on the topic clusters and their content. To facilitate understanding. FIGS. 7A-B, plots 700A and 700B are presented to illustrate the clustering operation, in accordance with an embodiment. It is to be appreciated that, as mentioned, each utterance can be represented by a multi-dimensional vector, while FIGS. 7A and 7B present the multi-dimensional vectors reduced to a 2-dimensional representation for understanding. FIG. 7A presents a plot 700A of respective utterances 610A-n comprising the utterances identified in the respective batches of utterances 210A-n processed once data drift d had been identified as occurring (e.g., the $10^{th}$ and subsequent batches 210A-n of FIGS. 4A-4C. Utterances 610A-n that are proximate to each other can be identified (e.g., topic analyzer 160 and clustering algorithms 162A-n) and form clusters/groups 710A-n of topics that may represent novel topics for which the autoencoder 121 has not been trained, e.g., the novel topics were not present in the training data 128. Accordingly, the respective utterances in a cluster 710A-n can be reviewed (e.g., by topic analyzer 160), and in the event of the utterances are coherent (e.g., having a common theme/topic), the new topics 170A-n can be generated based on the identified topic clusters 710A-n. The new topics 170A-n can be incorporated into the training data 128 to create an updated set of training data with which the autoencoder 121 can be retrained, thereby enabling the autoencoder 121 to identify topics in data subsequently received at the autoencoder 121 after the autoencoder 121 has been retrained. Any suitable clustering technique can be utilized by the topic analyzer 160, e.g., vector quantization (VQ). In an embodiment, topic analyzer 160 can cluster the utterances 610A-n based on their respective vector representation. For example, a k-means clustering algorithm 162A (e.g., a radius-based k-means clustering algorithm) can be applied by the topic analyzer 160 to cluster the utterances 610A-n into clusters comprising vectors that have the same, similar, or approximate value.

Figure 8:
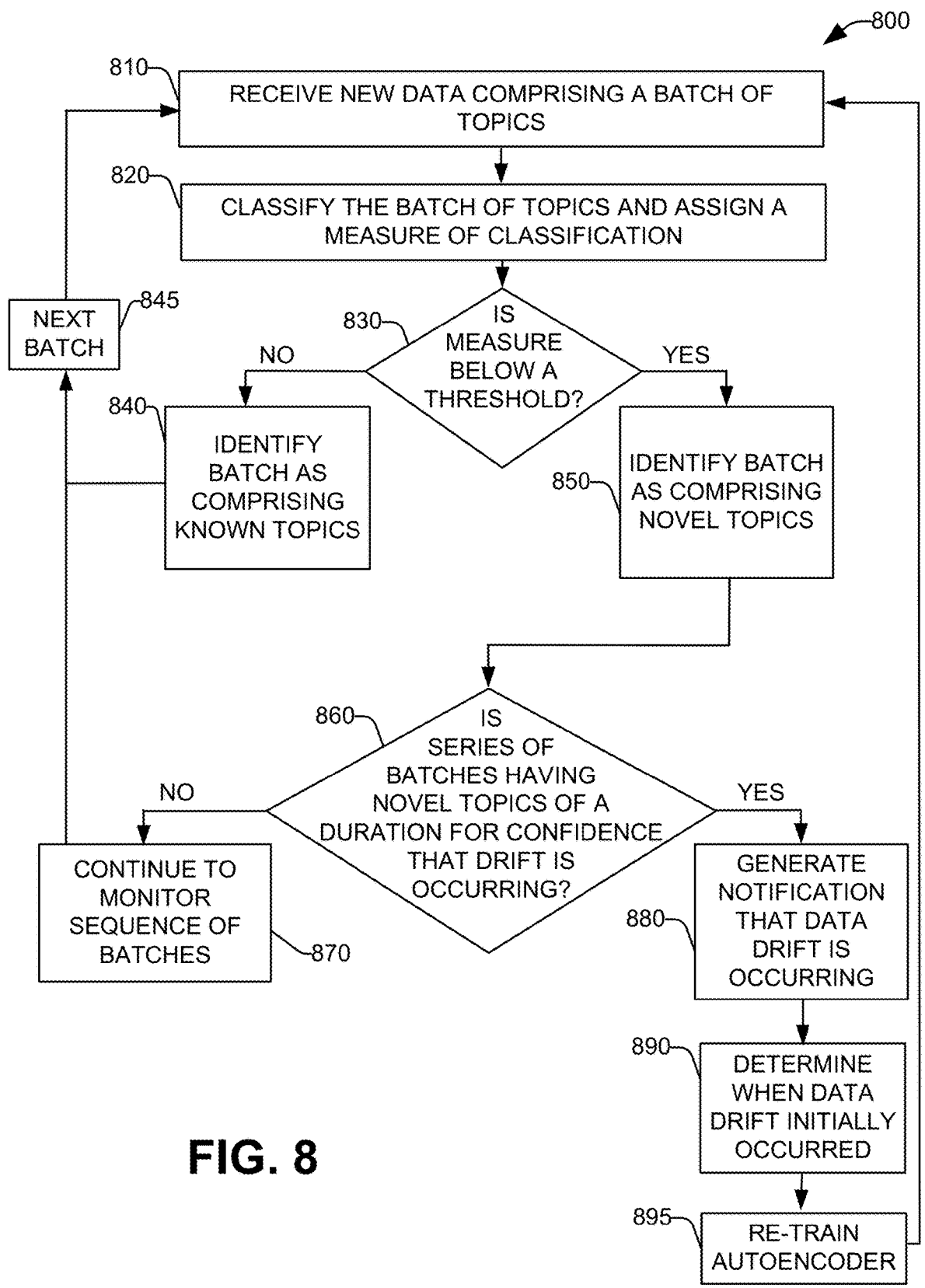
FIG. 8, presents a computer-implemented methodology for data drift detection of temporal data, according to one or more embodiments.

FIG. 8, methodology 800, illustrates a computer-implemented methodology for data drift detection of temporal data, according to one or more embodiments.

At 810, new data (e.g., new data 130) can be received at a system (e.g., at chatbot 125 of backend system 120), wherein the new data can be temporal data that is separated into batches (e.g., batches 210A-n) of topics (e.g., a combination of known topics 140 and unknown/novel topics 150), wherein, each batch can be generated based on a number of utterances received at the system, time-based batching, and suchlike.

At 820, each batch can be classified (e.g., by autoencoder 121) based on the topic content of each batch. As previously mentioned, classification can be based on determining the similarity of a topic of an utterance in the newly received data to the one or more topics included in the training data (e.g., training data 128) which was previously applied to train the autoencoder. Further, for each batch, an overall similarity measure can be determined based on the individual similarity measures of each utterance in the batch. E.g., in a simplified scenario, five utterances can have similarity measures of 0.12, 0.32, 0.06, 0.13, and 0.21, with the batch of utterances having a mean value of 0.168, which when a cosine function is applied (as previously described), the batch can have a similarity value of 0.986.

At 830, the similarity value can be compared with a threshold value (e.g., threshold 138). At 840, in the example approach presented herein, given the cosine function, if the similarity value is greater (e.g., tends to 1) than the threshold value, the batch of new data can be considered to comprise of topics that are already present in the training data and/or the number of incidences of novel topics is low. Methodology 800 can return to 810 for the next batch of new data to be analyzed.

Returning to 830, in the event of YES the similarity value is equal or less than the threshold, methodology 800 can advance to step 850, wherein the batch can be identified as comprising novel topics (e.g., identified as including a sufficient number/volume of novel topics causing the batch to be below the threshold).

Methodology 800 can further advance to step 860, wherein a determination (e.g., by DDC 135) can be made as to whether a sequence of below threshold batches have sufficient continuity/consistency such that a determination with a desired level of confidence/probability can be made that data drift is occurring (e.g., point d of FIGS. 3 and 4A-4C). In response to a determination that NO there is not a sufficient continuous sequence of batches identified as being below threshold, methodology 800 can advance to 870, wherein the sequence of batches is further monitored/processed, and methodology 800 can return to step 845 for the next batch to be analyzed.

Returning to 860, in response to a determination that YES, a sufficient continuous sequence of batches have been identified with a required number/volume of novel topics, methodology 800 can advance to 880, wherein a notification (e.g., in notifications 137A-n) can be generated (e.g., by DDC 135) that data drift has been detected.

Methodology 800 can further advance to 890, wherein the point in time at which the data drift began (e.g., point M of FIGS. 3 and 4A-4C) can be determined (e.g., by instructing the DDC 135 to identify when the novel topics 150 began to appear).

At 895, the newly captured batches of data can be used to re-train the classifier component (e.g., the autoencoder 121), wherein the classifier component is contemporaneous with the most recently received batches of data and any new topics included therein. Methodology 800 can return to 810, wherein the newly re-trained classifier component (e.g., the autoencoder 121) can be applied to the next batch of data received at the system (e.g., at chatbot 125) to further determine what topics are in the data, and further determine a subsequent time at which data drift the next sequence of batches of batches occurs after retraining of the autoencoder, and methodology 800 can return to step 810 for the next batch of data to be analyzed.

Figure 9:
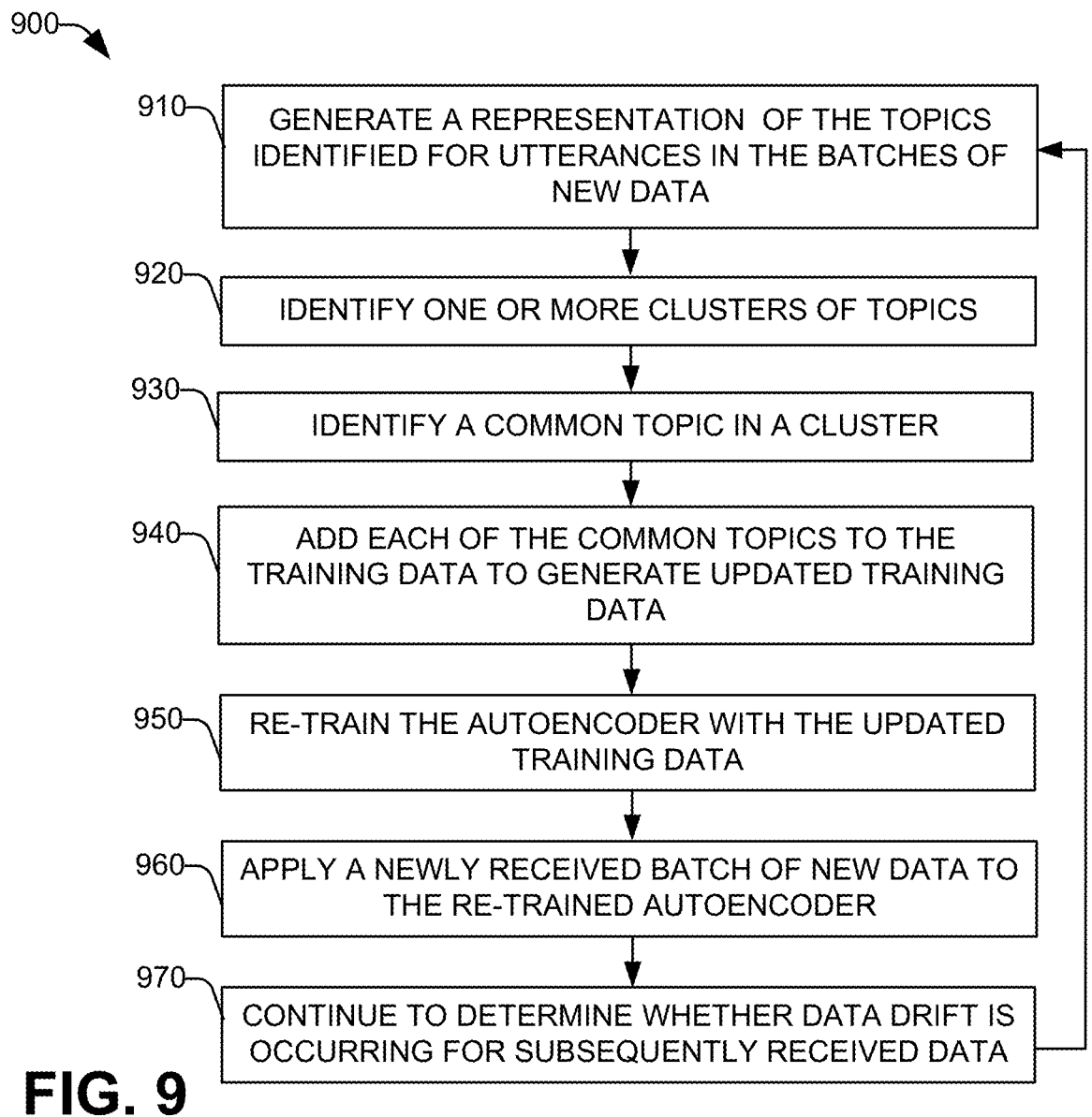
FIG. 9, presents a computer-implemented methodology for determining one or more topics causing data drift, according to one or more embodiments.

FIG. 9, methodology 900, illustrates a computer-implemented methodology for determining one or more topics causing data drift, according to one or more embodiments.

At 910, topics that have been identified as not being present and/or similar to topics in a training dataset (e.g., training data 128) can be analyzed (e.g., by DDC 135, topic analyzer 160 in conjunction with a clustering algorithm(s) 162A-n). To supplement review (e.g., by a data analyst) of the respective clusters, the topics can be represented on a chart (e.g., charts 700A/700B), wherein, the chart can be further presented on a screen (e.g., screen 119 of HMI 118). As previously mentioned, the chart can be a 2-D or a 3-D vector representation of the utterances, wherein, an utterance may be initially be represented by a vector have a significantly higher number of dimensions.

At 920, one or more clusters of topics (e.g., clusters 710A-n) can be identified (e.g., by DDC 135, topic analyzer 160 in conjunction with a clustering algorithm(s) 162A-n), e.g., based on proximity of respective utterances on the chart.

At 930, a common topic/theme/subject matter in a cluster can be identified (e.g., by DDC 135, topic analyzer 160 in conjunction with a clustering algorithm(s) 162A-n). A respective topic in each of the clusters can be identified, such that, for example, ten clusters can cause ten unique topics to be identified.

At 940, the respective identified topics can be added to the training data to generate an updated set of training data. The training data can be updated by, for example, a data analyst.

At 950, the data classifier (e.g., autoencoder 121) can be retrained with the updated training data. The data classifier can be retrained by, for example, a data analyst.

At 960, a newly received batch of new data can be applied to the newly retrained data classifier.

At 970, a determination can be subsequently made to identify whether data drift is occurring, and if so, topics not present in the updated training data can be further identified, per step 810 of FIG. 8.

The respective thresholds 138A-n, detection parameters 139A-n, etc., have an arbitrary magnitude and can be respectively configured/predefined in DDC 135 to any desired value. As used herein, the terms "infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In this particular embodiment, the autoencoder 121 and the associated algorithms 127A-n, algorithms 162A-n, DDC 135, topic analyzer 160, etc., can include machine learning and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process for (a) converting utterances into short streams of text, (b) determining similarity between topics included in new data 130 versus topics included in training data 128, (c) determining whether data drift d has occurred, (d) determining that data drift d has a sufficient duration for an acceptable level of confidence that data drift is occurring to be established. (d) separating known topics 140 from novel topics 150, and (c) identifying new topics 170A-n in the novel topics 150, and (f) generating updated training data with which to re-train the autoencoder 121, via an automatic classifier system and process. To prevent false-positives, a classifier is trained to err on the side of caution, and await a sufficient sequence of new data 130 in the form of batches 210A-n having a required level of dissimilarity to occur before a notification 137A-n is generated indicating that data drift has occurred.

A classifier is a function that maps an input attribute vector, x=(x1, x2, x3, x4, xn), to a class label class (x). The classifier can also output a confidence that the input belongs to a class, that is, f(x)=confidence (class (x)). Such classification can employ a probabilistic and/or statistical-based analysis (e.g., factoring into the analysis utilities and costs) to prognose or infer an action that a user desires to be automatically performed (e.g., inference of data drift is occurring).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the various embodiments can employ classifiers (e.g., autoencoder 121 and algorithms 127A-n) that are explicitly trained (e.g., via training data 128) as well as implicitly trained (e.g., via observing user behavior/utterances, receiving extrinsic information). For example, SVM's are configured via a learning or training phase within a classifier constructor and feature selection module. Thus, the classifier (s) can be used to automatically learn and perform a number of functions, including but not limited to determining according to predetermined criteria a likelihood of a data drift occurring, and new topics 170A-n being present in new data 130.

As described supra, inferences can be made, and operations performed, based on numerous pieces of information. For example, is data drift occurring? prior topics are stored, external information (e.g., availability of PCR test on the market), and suchlike. As the database of information accumulates (e.g., in memory 114) regarding instances of data drift/presence of new topics 170A-n, the data is analyzed to determine converging patterns such that inferences can be made regarding a future data drift incident(s) being detected and parameter settings (e.g., thresholds 138A-n, detection parameters 139A-n, and suchlike) to enable the data drift incident to be expeditiously determined.

Example Applications and Use

Figure 10:
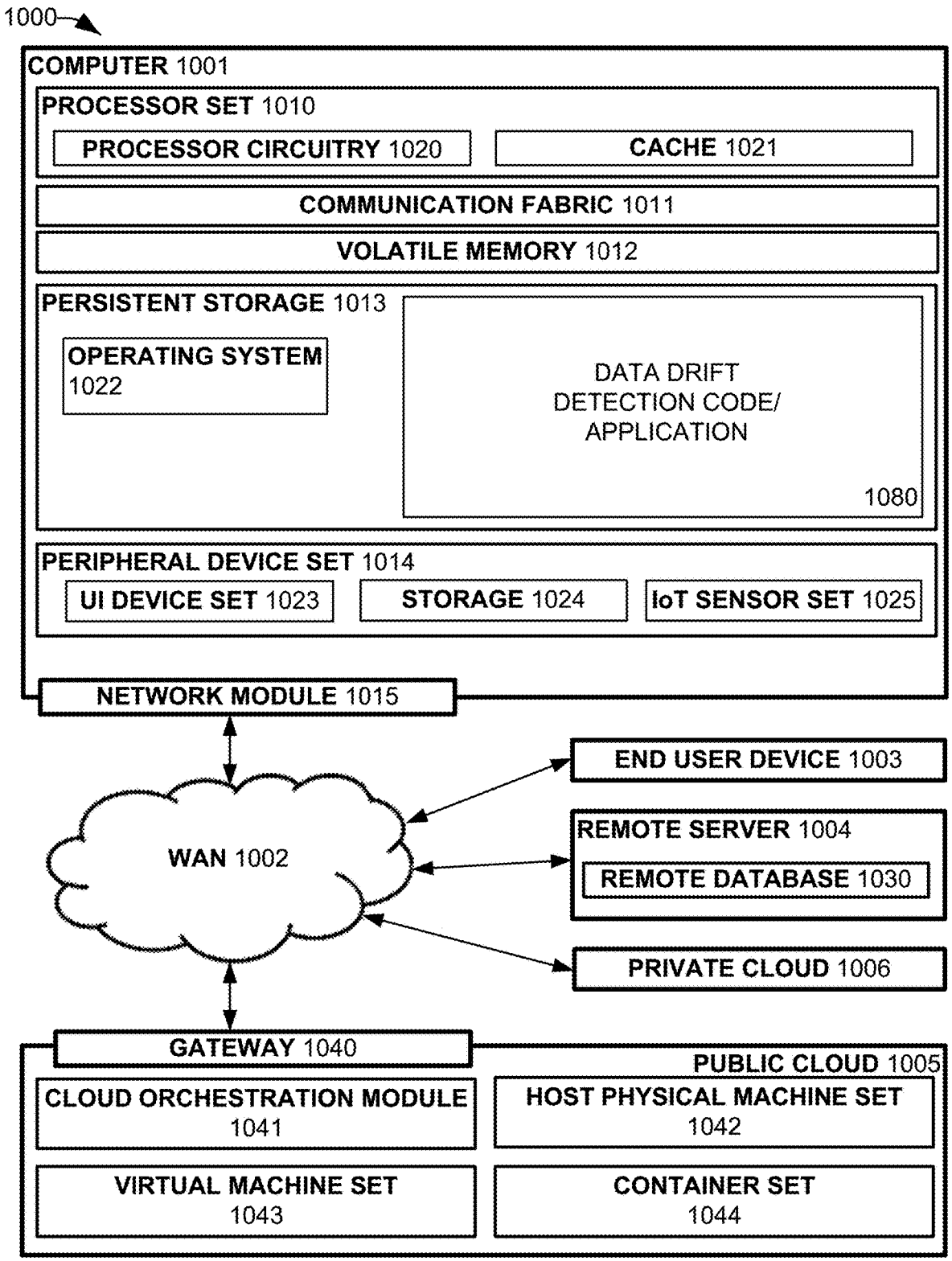
FIG. 10 depicts an example schematic block diagram of a computing environment with which the disclosed subject matter can interact/be implemented at least in part, in accordance with various aspects and implementations of the subject disclosure.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as data drift identification of batches of temporal data 130 by the data drift detection code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the Figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:
   a memory that stores computer executable components; and
   a processor that executes at least one of the computer executable components that:
      iteratively performs, until a tally of batches of utterances satisfies a first defined criterion associated with a first defined threshold:
         obtains, via a user interface system comprising a machine learning model, a new batch of utterances from one or more users of the user interface system, wherein the new batch of utterances is different from previous batches of utterances obtained by the user interface system, and wherein the machine learning model has been trained using a training dataset of utterances comprising a defined set of topics, and wherein the user interface system is deployed in a live user environment,
         determines a mean similarity value for the new batch of utterances, wherein the mean similarity value is based on respective similarity values determined for each utterance in the new batch of utterances to the defined set of topics of the training dataset,
         in response to the mean similarity value satisfying a second defined criterion associated with a second defined threshold indicative of the new batch of utterances deviating from the defined set of topics of the training dataset, increments the tally, and
         in response to the tally satisfying the first defined criterion associated with the first defined threshold, determines that data drift has occurred; and
      in response to determining that the data drift has occurred:
         identifies, from the new batches of utterances, clusters of utterances having respective topics not included in the defined set of topics of the training dataset,
         creates an updated training dataset by adding the clusters of utterances to the training dataset and adding the respective topics to the defined set of topics of the training dataset, and
         retrains the machine learning model using the updated training dataset.

2. The system of claim 1, wherein the respective similarity value is based upon a degree of similarity between the utterance and the defined set of topics of the training dataset, and wherein the second defined criterion associated with the second defined threshold comprises the mean similarity value deviating by at least the second defined threshold from an anchor point value representing the defined set of topics of the training dataset.

3. The system of claim 1, wherein the user interface system comprises a chatbot configured to:
   receive new data;
   format the new data into the utterances comprising short strings of text; and
   segment the new data into the new batches of utterances, wherein the utterances have the respective topics.

4. The system of claim 1, wherein the utterances in the new batch of utterances respectively comprise approximately three words.

5. The system of claim 1, wherein the at least one of the computer executable components further:
   identifies the respective topics of the utterances in the new batches of utterances.

6. The system of claim 1, wherein each utterance is represented by a multidimensional vector.

7. The system of claim 1, wherein the second defined criterion associated with the second defined threshold comprises the mean similarity value deviating by at least the second defined threshold from an anchor point value representing the defined set of topics of the training dataset.

8. The system of claim 1, wherein the at least one of the computer executable components further:
   in response to determining that the data drift has occurred:
      generates a notification that the data drift has occurred.

9. A method comprising:
   iteratively performing, by a system comprising a processor, until a tally of batches of utterances satisfies a first defined criterion associated with a first defined threshold:
      obtaining, via a user interface system comprising a machine learning model, a new batch of utterances from one or more users of the user interface system, wherein the new batch of utterances is different from previous batches of utterances obtained by the user interface system, and wherein the machine learning model has been trained using a training dataset of utterances comprising a defined set of topics, and wherein the user interface system is deployed in a live user environment, determining a mean similarity value for the new batch of utterances, wherein the mean similarity value is based on respective similarity values determined for each utterance in the new batch of utterances to the defined set of topics of the training dataset, in response to the mean similarity value satisfying a second defined criterion associated with a second defined threshold indicative of the new batch of utterances deviating from the defined set of topics of the training dataset, incrementing the tally, and in response to the tally satisfying the first defined criterion associated with the first defined threshold, determining that data drift has occurred; and in response to determining that the data drift has occurred:

identifying, by the system, from the new batches of utterances, clusters of utterances having respective topics not included in the defined set of topics of the training dataset, creating, by the system, an updated training dataset by adding the clusters of utterances to the training dataset and adding the respective topics to the defined set of topics of the training dataset, and retraining, by the system, the machine learning model using the updated training dataset.

10. The method of claim 9, wherein the respective similarity value is based on a degree of similarity between the utterances and the defined set of topics of the training dataset.

11. The method of claim 9, wherein the second defined criterion associated with a second defined threshold comprises the mean similarity value deviating by at least the second defined threshold from an anchor point value representing the defined set of topics of the training dataset.

12. The method of claim 9, further comprising:

in response to determining that the data drift has occurred:

generating, by the system, a notification that the data drift has occurred.

13. The method of claim 9, wherein the utterances in the new batch of utterances respectively comprise no more than three words.

14. The method of claim 9, wherein the user interface system comprises a chatbot configured to:

receive new data;

format the new data into the utterances comprising short strings of text; and segment the new data into the new batches of utterances, wherein the utterances have the respective topics.

15. A computer program product comprising a non-transitory computer readable medium having program instructions embodied therewith, the program instructions executable by a processor to cause the processor to:

iteratively performing, until a tally of batches of utterances satisfies a first defined criterion associated with a first defined threshold:

obtain, via a user interface system comprising a machine learning model, a new batch of utterances from one or more users of the user interface system, wherein the new batch of utterances is different from previous batches of utterances obtained by the user interface system, and wherein the machine learning model has been trained using a training dataset of utterances comprising a defined set of topics, and wherein the user interface system is deployed in a live user environment, determine a mean similarity value for the new batch of utterances, wherein the mean similarity value is based on respective similarity values determined for each utterance in the new batch of utterances to the defined set of topics of the training dataset, in response to the mean similarity value satisfying a second defined criterion associated with a second defined threshold indicative of the new batch of utterances deviating from the defined set of topics of the training dataset, increment the tally, and in response to the tally satisfying the first defined criterion associated with the first defined threshold, determine that data drift has occurred; and in response to determining that the data drift has occurred:

identify from the new batches of utterances, clusters of utterances having respective topics not included in the defined set of topics of the training dataset, create an updated training dataset by adding the clusters of utterances to the training dataset and adding the respective topics to the defined set of topics of the training dataset, and retrain the machine learning model using the updated training dataset.

16. The computer program product of claim 15, wherein the respective similarity value is based on a degree of similarity between the utterances and the defined set of topics of the training dataset.

17. The computer program product of claim 15, wherein the second defined criterion associated with the second defined threshold comprises the mean similarity value deviating by at least the second defined threshold from an anchor point value representing the defined set of topics of the training dataset.

18. The computer program product of claim 15, wherein the program instructions are further executable by the processor to cause the processor to:

in response to determining that the data drift has occurred:

generate a notification that the data drift has occurred.

19. The computer program product of claim 15, wherein the utterances in the new batch of utterances respectively comprise no more than three words.

20. The computer program product of claim 15, wherein the user interface system comprises a chatbot configured to:

receive new data;

format the new data into the utterances comprising short strings of text; and segment the new data into the new batches of utterances, wherein the utterances have the respective topics.

\* \* \* \* \*